US008292161B2

(12) United States Patent
Hacikyan

(10) Patent No.: US 8,292,161 B2
(45) Date of Patent: Oct. 23, 2012

(54) WELDING ALIGNMENT AND SPACING ARTICLE

(76) Inventor: Michael Hacikyan, Amherst, NY (US)

( * ) Notice: Subject to any disclaimer, the term of this patent is extended or adjusted under 35 U.S.C. 154(b) by 149 days.

(21) Appl. No.: 12/755,148

(22) Filed: Apr. 6, 2010

(65) Prior Publication Data

US 2011/0244265 A1     Oct. 6, 2011

(51) Int. Cl.
*B23K 101/04* (2006.01)
*B23K 37/04* (2006.01)

(52) U.S. Cl. .......................... 228/212; 228/135; 228/138

(58) Field of Classification Search .................. 228/212, 228/135, 138
See application file for complete search history.

(56) References Cited

U.S. PATENT DOCUMENTS

| 4,114,655 A | * | 9/1978 | Bloker | 138/89 |
| 4,346,918 A | | 8/1982 | Lycan | |
| 4,505,420 A | * | 3/1985 | Wittenbach | 228/212 |
| 4,611,830 A | | 9/1986 | von Ahrens | |
| 4,674,772 A | * | 6/1987 | Lycan | 285/22 |
| 5,884,919 A | * | 3/1999 | Saito | 277/562 |
| 6,059,320 A | | 5/2000 | Lycan | |
| 2006/0068142 A1 | * | 3/2006 | Hacikyan | 428/40.1 |
| 2007/0271865 A1 | * | 11/2007 | Rowohlt | 52/287.1 |

FOREIGN PATENT DOCUMENTS

GB         2120150 A     11/1983

OTHER PUBLICATIONS

Shur-Gap, AB Paper Company, downloaded on Sep. 25, 2008 from URL <http://apcompany1005.qwestoffice.net/>, 1 page.
Robvon Backing Ring Company, "Backing Rings TM Simplify Pipe Welding and Reduc Costs!" Jan. 1997, 4 pages.
AQUASOL, "SoluGap Water Soluble Socket Weld Spacer Ring", Jan. 21, 2009, 2 pages.

\* cited by examiner

*Primary Examiner* — Jessica L Ward
*Assistant Examiner* — Erin Saad
(74) *Attorney, Agent, or Firm* — Walter W. Duft

(57) ABSTRACT

A welding alignment and spacing article is provided for forming a welding gap between two structures to be welded together. The article includes a body having first and second surfaces that are spaced from each other at a selected spacing distance to define a region of selected body thickness. The body is formed from a non-metallic degradable body material in the region that can be wholly or partially degraded by exposure to a degrading agent to reduce the body thickness. The degradable body material is sufficiently incompressible to be useable as a spacer that maintains a specified welding gap distance between the two structures to be welded.

20 Claims, 9 Drawing Sheets

US 8,292,161 B2

WELDING ALIGNMENT AND SPACING ARTICLE

BACKGROUND OF THE INVENTION

1. Field of the Invention

The present invention relates generally to welding. More particularly, the invention is directed to articles used for welding work piece setup.

2. Description of Prior Art

By way of background, when two structures are to be welded together, the structures need to be positioned relative to each other to form a gap (known as a welding gap or root gap) into which the welding solder can flow and form a strong weld. For some welding applications, the required welding gap is governed by welding specifications promulgated by governmental entities, engineering organizations and/or standards bodies. In order to form a welding gap, the conventional practice has been to insert a piece of soldering rod between the structures to act as a spacer, and then create one or more tack welds to set the gap in an operation known as a root pass. Unfortunately, forming the tack weld tends to draw the structures together and pinch the spacer. This often requires a grinding operation to remove the trapped spacer material so that the full weld can be formed.

SUMMARY OF THE INVENTION

A welding alignment and spacing article is provided for forming a welding gap between two structures to be welded together. The article includes a body having first and second surfaces that are spaced from each other at a selected spacing distance to define a region of selected body thickness. The body is formed from a non-metallic degradable body material in the region that can be wholly or partially degraded by exposure to a degrading agent. The degradable body material is sufficiently incompressible to be useable as a spacer that maintains a specified welding gap distance between the two structures to be welded.

Optionally, the article can be configured with a pre-defined breakpoint that divides the article into a spacer portion that includes the region of selected body thickness and an attachment portion that is positionable to lie on a non-welding surface of one of said structures for attaching the article. The article may also be placed in the welding gap without attaching it, if so desired.

The article may be used in a welding method to form a tack weld assembly in which the article is placed between the structures to be welded to define a welding gap. A tack weld may be formed in the welding gap at a selected distance from the article. The article may then be exposed to a degrading agent for a time that is sufficient to degrade the body and reduce the body thickness so that the article can be removed. Additional welding may then be performed in the welding gap to complete the welding of the structures.

BRIEF DESCRIPTION OF THE DRAWINGS

The foregoing and other features and advantages of the invention will be apparent from the following more particular description of example embodiments, as illustrated in the accompanying Drawings, in which.

DETAILED DESCRIPTION OF EXAMPLE EMBODIMENTS

Figure 1:
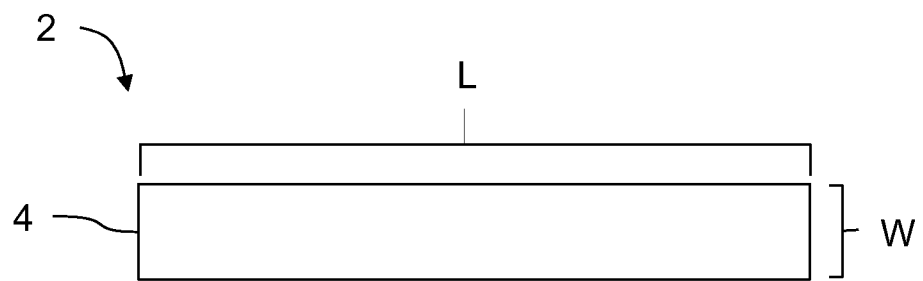
FIG. 1 is a plan view showing an example welding alignment and spacing article.
Figure 2:
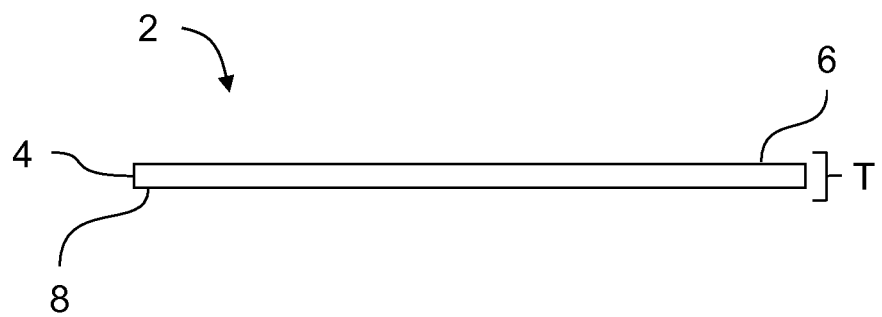
FIG. 2 is a side view of the article of FIG. 1.

Turning now to the Drawings, which are not necessarily to scale, FIGS. 1 and 2 illustrate one possible embodiment of a welding alignment and spacing article, which is generally identified by reference number 2. The article 2 includes a body 4 having first and second surfaces 6 and 8 that are spaced from each other at a selected spacing distance to define a region of selected body thickness T. In the embodiment of FIGS. 1 and 2, this region comprises the entire body 2 and the region of selected body thickness is substantially uniform through the body. In other embodiments (not shown), the region of selected body thickness T might only comprise a portion of the body 2 or the selected body thickness might not be substantially uniform throughout the body. The embodiment of FIGS. 1 and 2 also features a body 2 that is shaped as an elongated generally rectangular stick having the aforementioned thickness dimension T, a width dimension W, and a length dimension L that is larger than the thickness dimension and the width dimension. Although not shown, the body 2 could have other shapes in alternative embodiments of the article 2.

In order to better support the needs of the welding community, the article 2 could be produced in a variety of sizes having different length, width and thickness dimensions. Generally speaking, larger structures will warrant larger article sizes and visa versa. Relatedly, factors such as commercial welding gap specifications and codes may be important. Applicable welding specifications and codes include those promulgated by governmental entities (e.g. the U.S. Naval Sea Systems Command (N.A.V.S.E.A)), engineering organizations (e.g., the American Society of Mechanical Engineers (ASME)) and standards bodies (e.g., the American Welding Society (A.W.S.) and the American Petroleum Institute (A.P.I.)). For example, articles 2 having different thicknesses based on different welding gap specifications could be produced, such as thicknesses that are a multiple of 1/16 inch (e.g., 1/16 inch, 1/8 inch, 3/16 inch, 1/4 inch, etc.) or substantially a multiple of such dimensions (i.e., plus or minus allowable root gap tolerances, e.g., 1/32 inch). Articles 2 produced with these dimensions have been determined to comply with the following welding specifications and codes:
1. A.W.S. D1.1, Structural Welding Code, Section 3.20 (Prequalified Complete Joint Penetration Grove Welds);
2. A.W.S. D10.11, Guide for Root Pass Welding Of Pipe Without Backing;
3. A.P.I. 1104, American Petroluem Institute; and
4. N.A.V.S.E.A. S9074-AR-GIB-010/278, Requirements For Fabrication & Welding & Inspection Of Piping, Pressure Vessels, Naval And Iron Ships.

Note that if welding gaps larger than $3/16$ or $1/4$ inch are required, several of the articles 2 could be stacked together so that their individual thicknesses combine to provide the required welding gap.

The articles 2 may be produced in suitable lengths and widths for different welding applications. For example, standard lengths of 4 inches, 6 inches, etc., and standard widths of $1/4$ inch, $1/2$ inch, etc. could be provided. For increased versatility, it may be desirable to produce several articles 2 that are breakably attached along their length and/or width dimensions. Users could then use the several articles in their joined condition or could break them apart to form smaller article sizes. By way of example, two $1/4$ inch wide articles 2 could be joined along their length dimension to provide the option of using a $1/2$ inch wide article combination or splitting the combination apart to form two $1/4$ inch articles. Similarly, two 4 inch long articles 2 could be joined along their length dimension to provide the option of using an 8 inch long article combination or splitting the combination apart to form two 4 inch articles. The forgoing article combinations may be joined together in any suitable manner, such as by scoring a material sheet comprising plural article units so that the units are only partially attached to each other.

The body 4 can be formed (at least in the region of selected body thickness) from a non-metallic degradable body material that can be wholly or partially degraded by exposure to a degrading agent. The non-metallic body material may be chosen to degrade in the presence of a suitable degrading agent, including but not limited to a degrading agent selected from the group consisting of liquids, gasses, solids, thermal energy or other energy types, and combinations of the foregoing. Examples of the such degrading agents include, but are not limited to, (1) water or a water-containing substance applied by spraying, streaming, jetting, misting, wiping, etc., (2) a non-aqueous substance applied in the same manner, (3) heat energy applied with a welding gun, a torch or the like, and (4) any other suitable degrading material or instrumentality applied in any suitable manner.

Water-degradable materials represent one class of material that may be used to form the body 4. A suitable water-degradable material may comprise a composition such as liquid-degradable paper, liquid-degradable polymer, and combinations of such materials. Water-soluble paper is one example of liquid-degradable paper that may be used. Polyvinyl alcohol is one example of liquid-degradable polymer that may be used. Water-degradable materials are convenient because water is often used for pressure testing welded pipelines, or to flush welded pipelines prior to start up, and these operations will thus clear away remnants of the article 2 that may enter the pipe interior without extra steps. A suitable water-soluble paper is commercially available from Aquasol Corporation of North Tonawanda, N.Y. under the trademark Aquasol®. The Aquasol® brand paper is made of Sodium Carboxy Methyl cellulose and wooden pulp that dissolves rapidly and completely in most liquids, including water. This material can also be degraded using heat (as may be provided by a welding gun or a torch) or non-aqueous degrading agents, such as ammonia. Other fibrous materials could also be used to form the body 4, as could non-fibrous materials such as degradable polymeric resins that can be degraded chemically and/or thermally.

The degradable body material should be sufficiently incompressible to be useable as a spacer that maintains a specified welding gap distance between two structures that are to be tack welded (not shown in FIGS. 1 and 2). If water-soluble paper is used as the degradable body material, the body 2 can be formed by laminating plural layers of the paper to form a water-degradable paper laminate having the selected body thickness T. The paper layers that form the laminate can be bonded together using any suitable technique, such as by applying an adhesive or an adhesive layer (not shown) between the paper layers. Advantageously, the use of a paper laminate construction allows the body thickness to be carefully controlled by selecting the number of paper layers (which are relatively thin) to include in the laminate. If desired, a standard laminate of minimal thickness could be produced and articles with increased body thickness may be formed by joining together two or more of such standard laminates. For example, if a standard laminate has a thickness of substantially $1/16$ inch, articles 2 could be produced having thicknesses that are a multiple of substantially $1/16$ inch by selectively forming stacks comprising one or more of such laminates.

The body 4 may be of solid construction without any hollow formations (such as apertures) therein. Alternatively, areas of the body 4 may be provided with such formations (as by forming the body 4 as an apertured lattice structure) in order to save material. However, care should taken to ensure that the spacing function of the articles 2 will be maintained and that the body 4 will not be unduly compressed by the welding structures during tack welding. If desired, the body 4 may be formed by die-cutting or otherwise removing it from a larger material sheet, such as a paper laminate. In order to provide plural articles 2 that are detachable connected to each other (as described above), the die cuts could be partial so that the cuts pass substantially through the material thickness without fully separating the articles.

Figure 3:
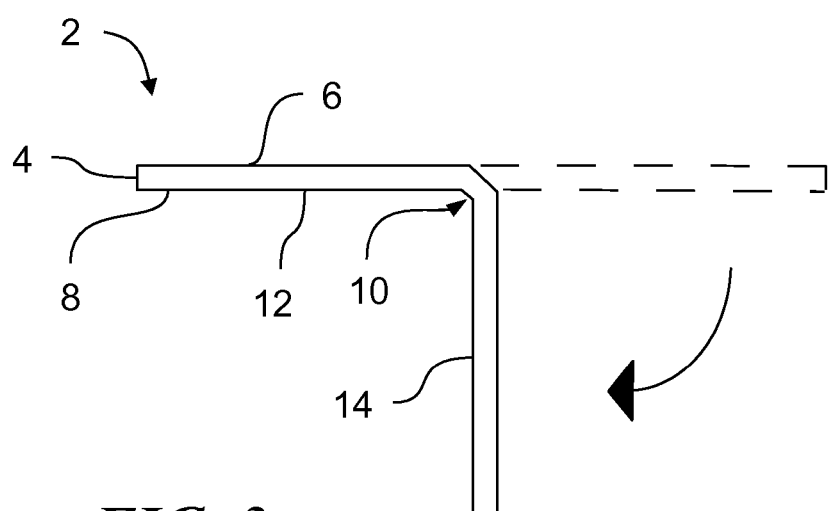
FIG. 3 is a side view of the article of FIG. 1 after it has been folded.

As shown in FIG. 3, the article 2 can be optionally folded immediately prior to use in order to define a breakpoint 10. The breakpoint 10 divides the body 4 into a spacer portion 12 and an attachment portion 14. The spacer portion 12 is for placement of the article 2 between the structures to be welded. The attachment portion 14 is angled relative to the spacer portion (e.g., by 90 degrees) and is for optional attachment of the article 2 to a non-welding surface of one of the structures to be welded (as described in more detail below), such as by taping, pasting or gluing.

Alternatively, the article 2 may be configured with a predefined breakpoint. As will now be described in the context of several alternative embodiments, this predefined breakpoint may be formed in a number of ways. By way of example, the pre-defined breakpoint may be provided so that the spacer portion 12 includes a first portion of the body 4. The attachment portion 14 may then either (1) include a second portion of the body 4, or (2) include a partial thickness portion of the body 4, or (3) include a non-body portion of the article 2 (i.e., a separately attached element).

Figure 1A:
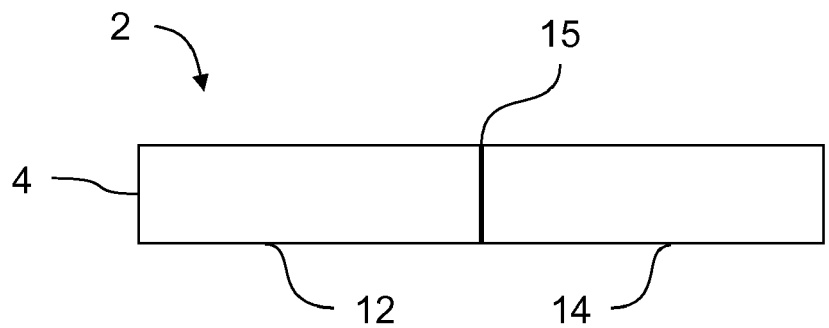
FIG. 1A is a plan view showing a variation of the article of FIG. 1.
Figure 2A:
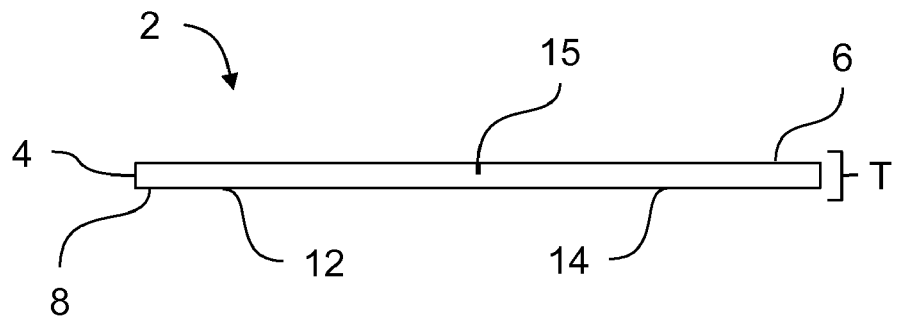
FIG. 2A is a side view of the article of FIG. 1A.

FIGS. 1A and 2A illustrate one example of a pre-defined breakpoint that comprises a score 15. The score 15 divides the body 4 into a spacer portion 12 and an attachment portion 14. The score 15 can be formed as a linear cut (e.g., a die cut) that extends partially through the body 3. It allows the body 4 to be folded from a first orientation shown in FIG. 2A to a second orientation shown in FIG. 3A. In the first orientation of FIG.

Figure 3A:
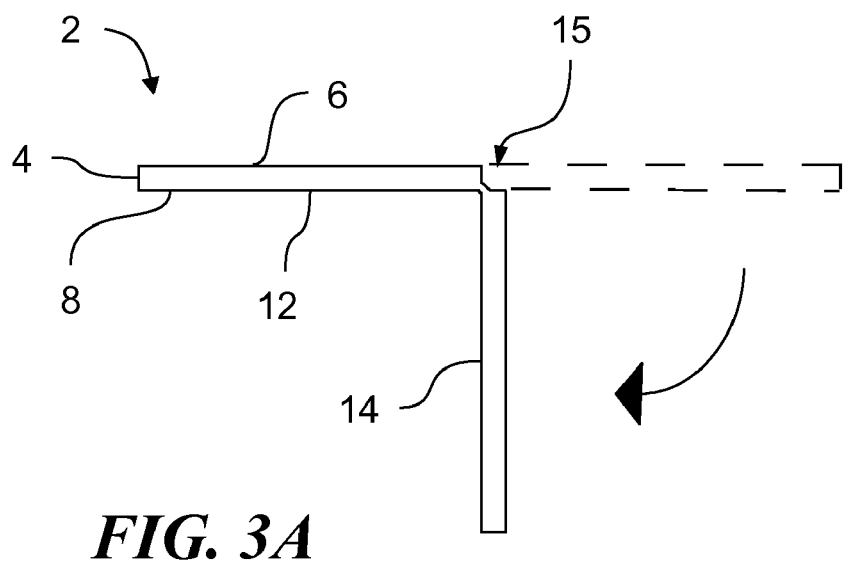
FIG. 3A is a side view of the article of FIG. 1A after it has been folded.

2A, the spacer portion 12 and the attachment portion 14 are substantially coplanar. In the second orientation shown in FIG. 3A, the spacer portion 12 and the attachment portion 14 are not coplanar. In particular, FIG. 3A shows that the two portions 12 and 14 are oriented 90 degrees apart.

Figure 4:
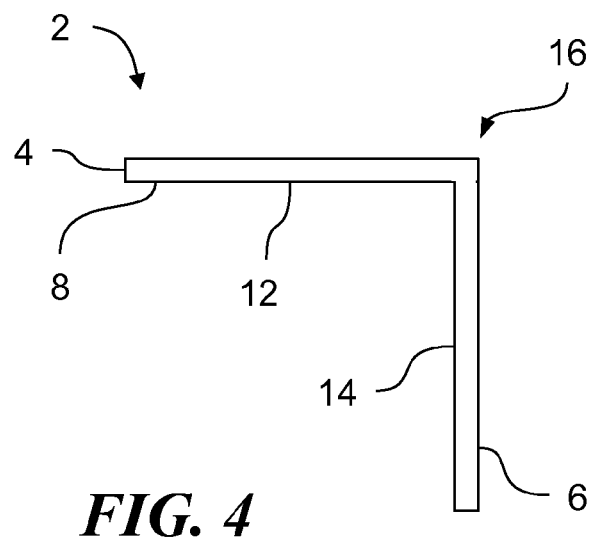
FIG. 4 is a side view of an alternative configuration of the article of FIG. 1.

FIG. 4 shows an alternative configuration wherein a pre-defined breakpoint is formed as a permanent junction 16 that again divides the body 4 into a spacer portion 12 and an attachment portion 14. Both the spacer portion 12 and the attachment portion 14 extend from the permanent junction 16 in an orientation that is not coplanar. In particular, the permanent junction 16 is a 90 degree bend permanently formed in the body 4.

Figure 5:
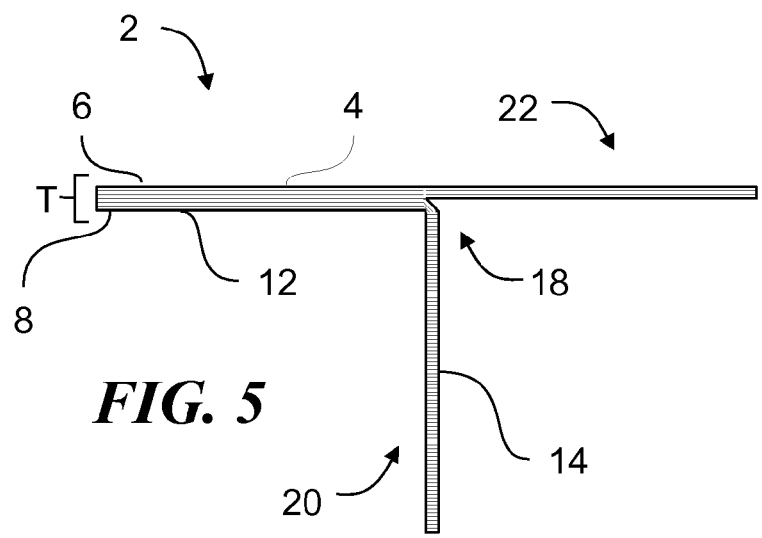
FIG. 5 is a side view of another alternative configuration of the article of FIG. 1.

FIG. 5 shows a further alternative configuration wherein a pre-defined breakpoint is again formed as a permanent junction 18. However, the article 2 is formed so that the spacer portion 12 includes the body 4 and the attachment portion 14 includes a first partial-body portion 20 of the article. There is also a second partial body portion 22 that may be either be removed or allowed to remain as part of the article 2. This configuration is suitable for use when the degradable body material comprises a laminate. The laminate is divided at the junction 18. One or more of the laminate layers can be peeled away from the remaining layer(s) to form the first partial body portion 20 that provides the attachment portion 14. The remaining layer(s) of the laminate forms the second partial body portion 22.

Figure 6:
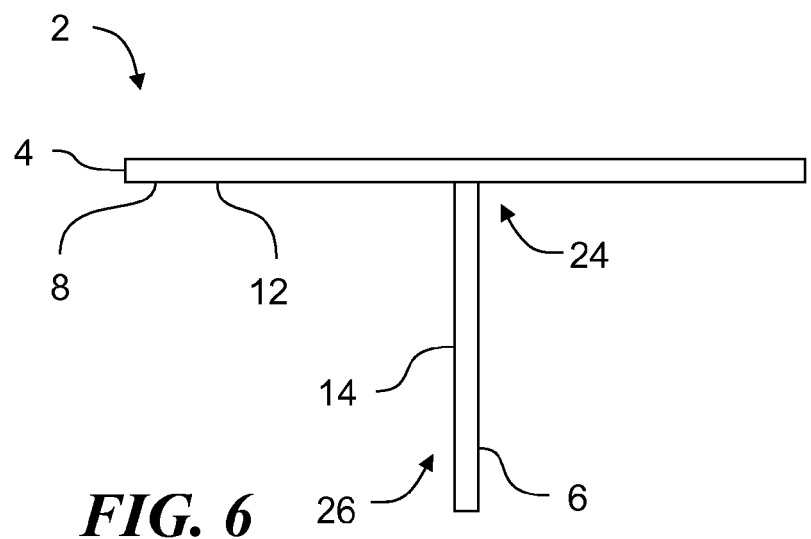
FIG. 6 is a side view of a further alternative configuration of the article of FIG. 1.

FIG. 6 shows a still further alternative configuration wherein a pre-defined breakpoint is again formed as a permanent junction 24. In this configuration, the spacer portion 12 includes the body 4 and the attachment portion 14 includes a non-body portion 26 of the article 2. In particular, the non-body portion 26 is a separate attachment component that is mounted to the body 4 using a suitable attachment technique, such as adhesive bonding. Although not shown, the base of this component could be folded or otherwise configured to provide a flange that lies on the body 4 to assist in anchoring the component to the body 4.

The article 2 may be used in a welding method to form a tack weld assembly in which the article (or typically several of the articles) is placed between two structures to be welded to define and maintain a welding gap during tack welding. The article 2 serves to space apart the welding structure at a proper welding gap spacing distance, and may also serve to align the structures at a proper angle in some configurations. Thus, the article 2 may serve both a spacing function (distance) and an alignment (angle) function. Once the article 2 is in position, one or more tack welds may be formed in the welding gap at a selected distance from the article. The article 2 may then be exposed to a degrading agent for a time that is sufficient to degrade the body 4 and reduce the body thickness T so that the article can be removed from the welding gap. Additional welding may then be performed in the welding gap to complete the welding of the structures.

Figure 7:
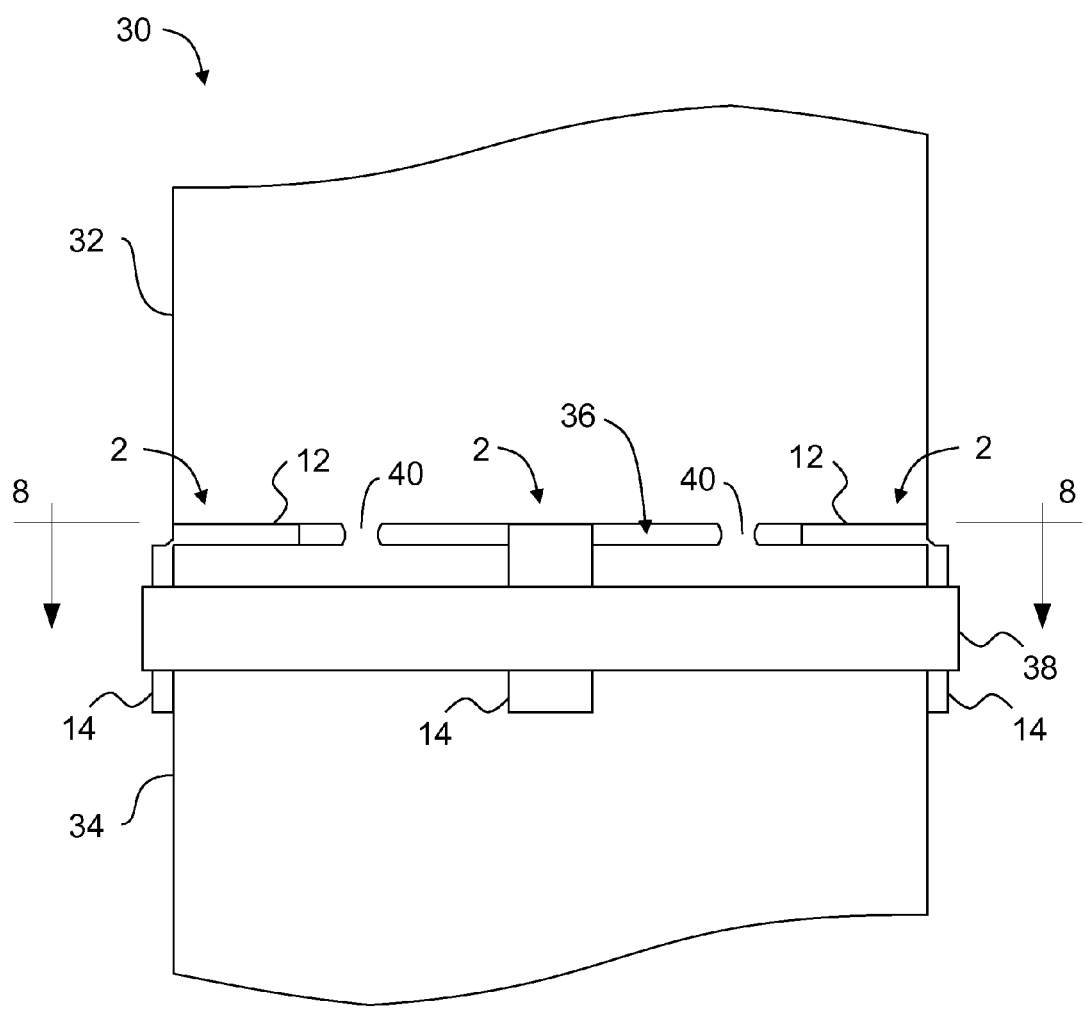
FIG. 7 is a side elevation view showing an example assembly using the article of FIG. 1.
Figure 8:
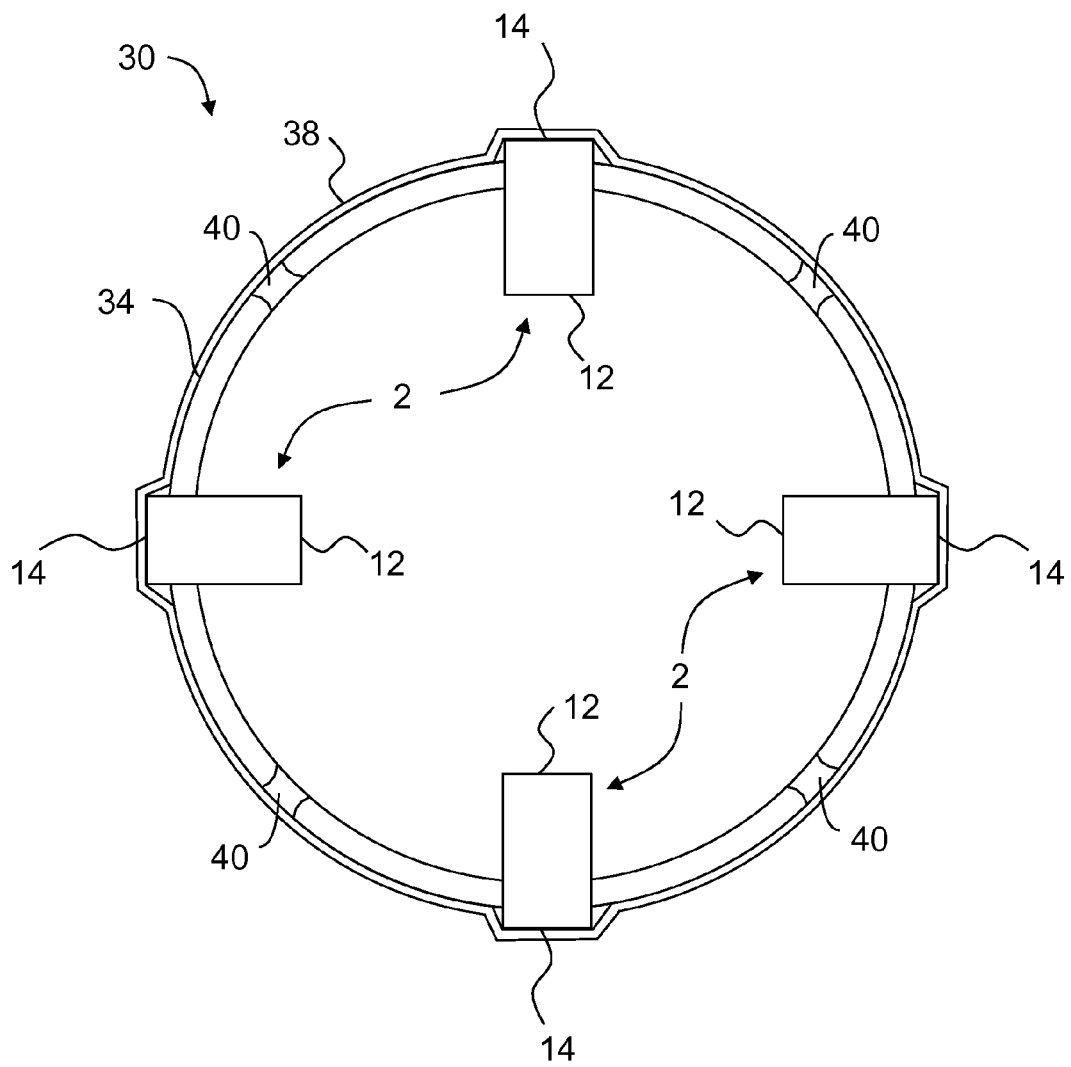
FIG. 8 is a cross-sectional view taken along line 8-8 in FIG. 7.

FIGS. 7 and 8 illustrate an example tack weld assembly 30 wherein the two structures to be welded are an upper pipe 32 and a lower pipe 34. Alternatively, instead of a pipe, one of the structures could be the neck of a weld-neck flange. By way of example only, four of the articles 2 are placed on the circumferential top edge of the lower pipe 34 at 90 degree intervals. Depending on alignment/spacing requirements, welder preferences and possibly other factors, a smaller or larger number of the articles might be used. In many cases, the number of the articles 2 used in a given assembly will be at least two or three, but less than or equal to the number of tack welds to be formed. However, this is noted merely as an example and is not a hard and fast rule. By way of illustration, if the articles 2 are used primarily for spacing the pipes 32/34 and not for angularly aligning them (e.g., because the pipes are held by a separate alignment jig), perhaps only two of the articles will be required. On the other hand, if the articles 2 are also used to angularly align the pipes 32/34, it may be preferable to strategically place an additional number of the articles 2 around the top edge of the lower pipe 34. The articles 2 may all have the same thickness T, or they may have different thicknesses selected to provide a desired alignment angle.

In FIGS. 7-8, the articles 2 represent the embodiment shown in FIGS. 1A, 2A and 3A. The articles 2 thus include a score that divides the body 4 into a spacer portion 12 and an attachment portion 14. The spacer portions 12 of the article bodies 4 define a continuous circular welding gap 36 (also known as a root gap) and the attachment portions 14 are positioned to lie on the outside surface of the lower pipe 34, which is a non-welding surface. Alternatively, the attachment portions 14 could lie against the upper pipe 32. Either positioning will involve folding the bodies 4 to angle the spacer and attachment portions 12 and 14. If desired, the articles 2 may be secured in place by taping the attachment portions 14 of the article bodies 4 to the desired surface. In the illustrated embodiment, a length of adhesive tape 38 is wrapped around the pipe 34 to secure each of the articles 4. The articles 2 may also be separately taped. Water-degradable tape may be used for such taping, and has the advantage that it may be easily removed using the same aqueous wetting operation that may be used to degrade the articles 2 (assuming they are water-degradable). Other attachment techniques could also be used, such as by applying an adhesive bonding material (e.g., glue or paste) between the attachment portions 14 and the desired surface. Although not shown, a further alternative would be to provide an adhesive strip on the attachment portion 14 of each article 2, or form the attachment portion itself as an adhesive strip. A backing sheet could be provided to cover the adhesive strip until it is time to attach the articles.

Once the articles 2 have been placed and the pipes 32 and 34 are in proper position, one or more tack welds 40 may be formed in the welding gap 36. This operation is sometimes referred to as the root pass of the welding operation. The tack welds 40 may be formed approximately half-way between the articles 2, or at any other selected distance therefrom. Each article 2 may now be contacted with a degrading agent for a time that is sufficient to degrade the body 4 and reduce the body thickness T so that the article can be removed from the gap. If the degrading agent is a liquid, it could be applied by wiping the articles 2 with a wet cloth or wipe, or by directing a liquid-containing jet, stream, spray or mist onto the articles 2, or in any other suitable fashion. Note that it may not be necessary to completely degrade the body 4. In some cases the body 4 may only need to be degraded to the point where its is sufficiently loose in the welding gap 36 so that the body can be pulled away from the pipes 32/34 or perhaps pushed into the pipe interior. In the latter case, the body 4 may be further degraded and/or expelled from the pipe interior during hydraulic pressure testing, as is commonly performed using water in a new pipeline installation following welding. Once the body 4 has been removed from the welding gap 36, additional welding may be performed in the welding gap to complete the welding of the pipes 32 and 34.

Figure 9:
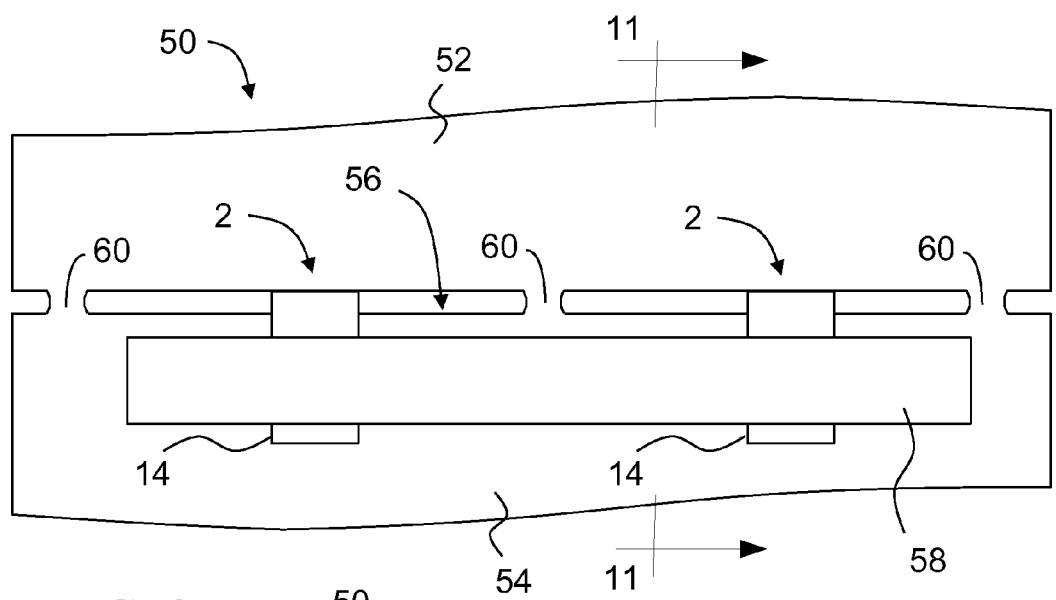
FIG. 9 is a bottom plan view of another example assembly using the article of FIG. 1.
Figure 10:
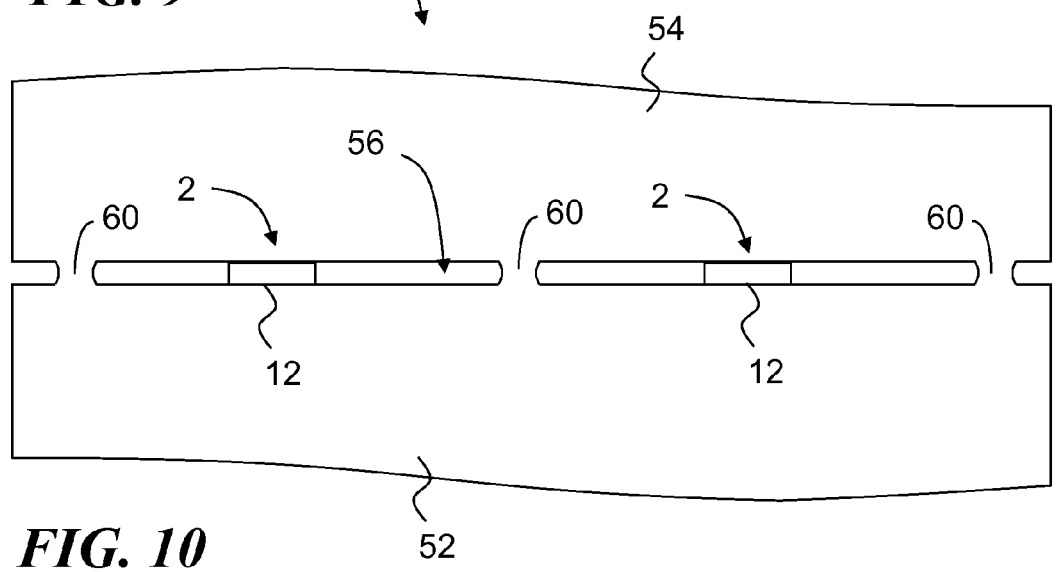
FIG. 10 is a top plan view of the assembly of FIG. 9.
Figure 11:
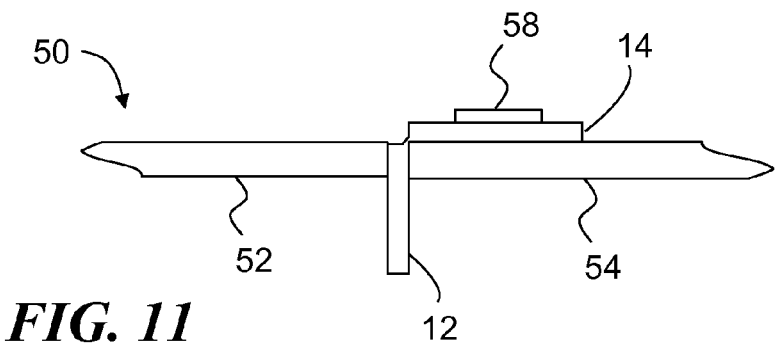
FIG. 11 is a cross-sectional view taken along line 11-11 in FIG. 9.

FIGS. 9-11 illustrate a further example tack weld assembly 50 wherein the two structures to be welded are a pair of flat plates or sheets 52 and 54. By way of example only, three of the articles 2 from the embodiment of FIGS. 1A, 2A and 3A are used. Once again, a different number of the articles (or articles of differing thickness T) could be used depending on factors such as the size of the structures 52/54 and whether the articles 2 are being used for spacing or additionally for angular alignment purposes. The spacer portions 12 of the article bodies 4 define a linear welding gap 56 and the attachment portions 14 are positioned to lie on the outside surface of one of the structures 52/54, which are non-welding surfaces.

If desired, the articles 2 can be secured in place by taping the attachment portions 14 of the article bodies 4 to the desired surface. In the illustrated embodiment, a length of adhesive tape 58 is used for this purpose. Other attachment alternatives such as those described above in connection with FIGS. 7-8 may also be used. Once the articles 2 are in proper position, one or more tack welds 60 may be formed in the welding gap 56. The tack welds 60 may be formed approximately half-way between the articles 2, or at any other selected distance therefrom. Each article 2 may now be exposed to a degrading agent for a time that is sufficient to degrade the body 4 and reduce the body thickness T so that the article can be removed from the gap. Reference is made to the previous description of FIGS. 7 and 8 for further details, options and alternatives. Once the body 4 has been removed from the welding gap 56, additional welding may be performed in the welding gap to complete the welding of the structures 52 and 54.

Figure 12:
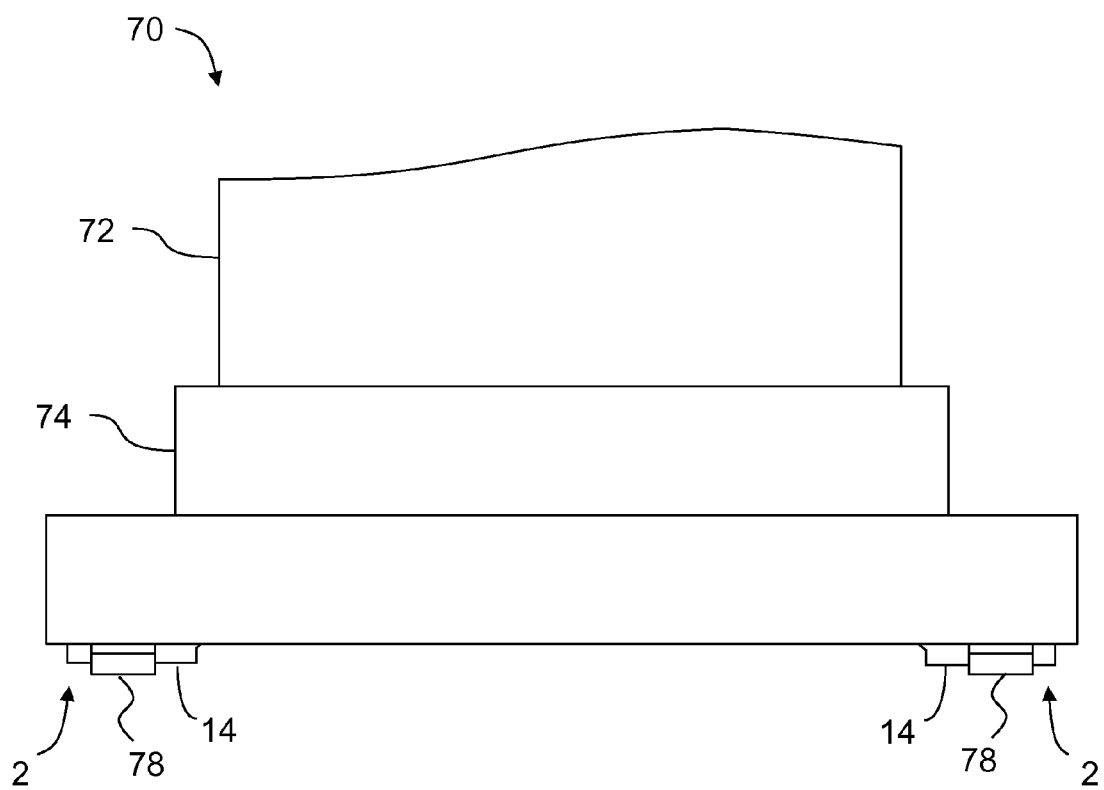
FIG. 12 is a side elevation view of another example assembly using the article of FIG. 1.
Figure 13:
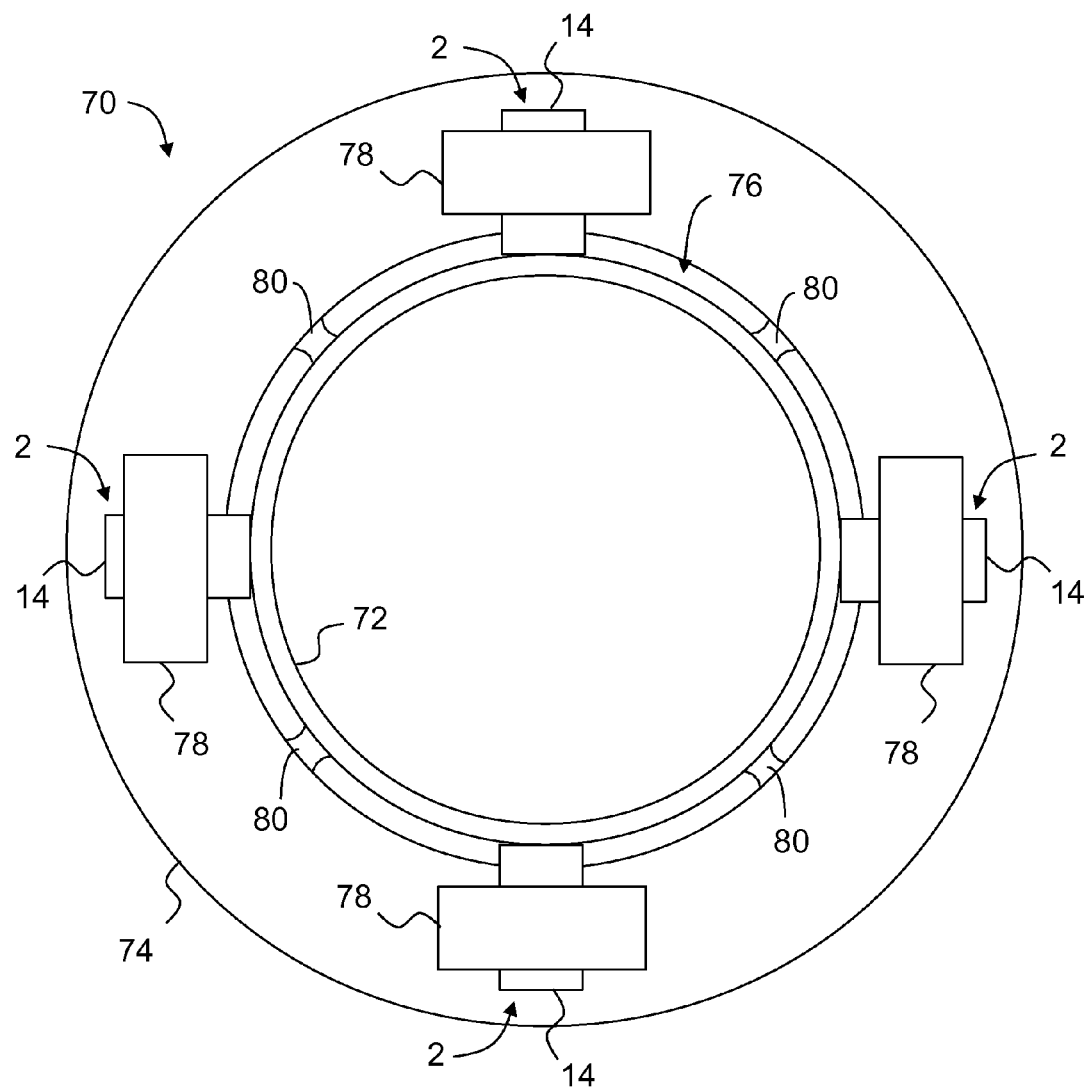
FIG. 13 is a bottom plan view of the assembly of FIG. 12.
Figure 14:
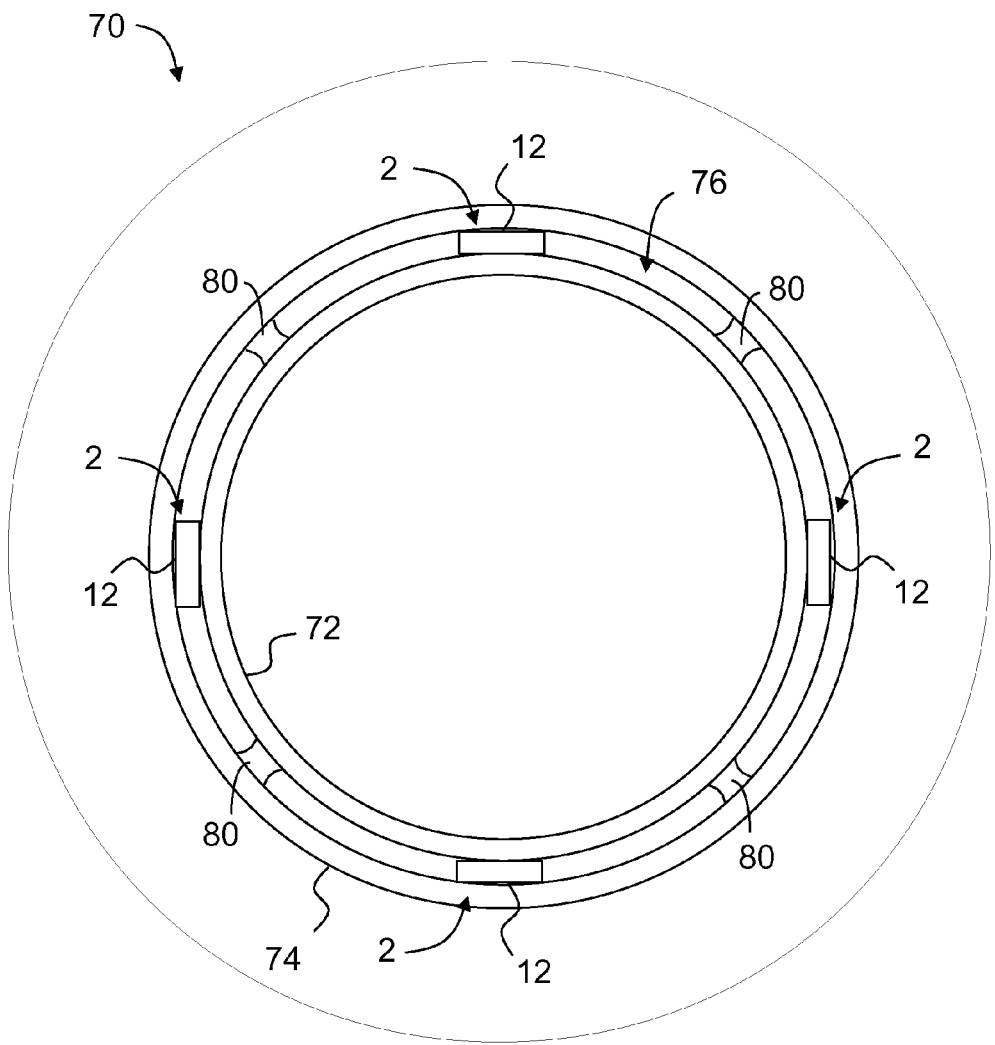
FIG. 14 is a top plan view of the assembly of FIG. 12.

FIGS. 12-14 illustrate a further example tack weld assembly 70 wherein the two structures to be welded are a pipe 72 and a slip flange 74. By way of example only, three of the articles 2 from the embodiment of FIGS. 1A, 2A and 3A are placed between the outside wall of the pipe 72 and the inside wall of the flange 74. Once again, the number of the articles 2 (and their thicknesses T) that are used will depend on various factors, such as the size of the structures 72/74 and whether the articles 2 are being used for spacing or additionally for angular alignment purposes. The spacer portions 12 of the article bodies 4 define a continuous annular welding gap 76 and the attachment portions 14 are positioned to lie on the bottom surface of the flange 74, which is a non-welding surface.

If desired, the articles 2 can be secured in place by taping the attachment portions 14 of the article bodies 4 to the desired surface. In the illustrated embodiment, lengths of adhesive tape 78 are used for this purpose. Other attachment alternatives such as those described above in connection with FIGS. 7-8 may also be used. Once the articles 2 are in proper position, one or more tack welds 80 may be formed in the welding gap 76. The tack welds 80 may be formed approximately half-way between the articles 2, or at any other selected distance therefrom. Each article 2 may now be exposed to a degrading agent for a time that is sufficient to degrade the body 4 and reduce the body thickness T so that the article can be removed from the gap. Reference is made to the previous description of FIGS. 7 and 8 for further details, options and alternatives. Once the body 4 has been removed from the welding gap 76, additional welding may be performed in the welding gap to complete the welding of the structures 72 and 74.

Accordingly, a welding alignment and spacing article has been disclosed. While various embodiments of the invention have been described, it should be apparent that many variations and alternative embodiments could be implemented in accordance with the teachings set forth herein. For example, although several tack welding assemblies using the articles 2 have been described and illustrated, it will be appreciated that the welding applications in which the articles may be used are virtually unlimited. Nor is there any limitation with respect to the type of welding that is performed. It will therefore be understood that the invention is not to be in any way limited except in accordance with the spirit of the appended claims and their equivalents.

What is claimed is:

1. A welding method, comprising:
   selecting first and second metallic structures to be welded together;
   placing a welding alignment and spacing article between said structures to define a welding gap;
   said article comprising:
      a body;
      a first surface on said body;
      a second surface on said body;
      said first and second surfaces being spaced from each other at a selected spacing distance to define a region of selected body thickness;
      said body being formed from a non-metallic degradable body material in said region that can be wholly or partially degraded by exposure to a degrading agent in order to reduce said body thickness; and
      said degradable body material being sufficiently incompressible to be useable as a spacer that maintains a specified welding gap distance between said structures during tack welding;
   forming a tack weld in said welding gap between said structures at a selected distance from said article;
   thereafter exposing said article to said degrading agent for a time that is sufficient to degrade said body and reduce said body thickness so that said article can be removed from said welding gap;
   thereafter performing additional welding in said welding gap to complete said welding together of said structures; and
   wherein the degrading agent does not comprise welding.

2. The method of claim 1, wherein said first structure is selected from the group consisting of pipes, plates and sheets, and said second structure is selected from the group consisting of pipes, pipe flanges, plates and sheets.

3. The method of claim 1, wherein more than one of said articles are used to define said welding gap.

4. The method of claim 3, wherein more than one of said tack welds is formed between said structures.

5. The method of claim 4, wherein the number of said articles is less than or equal to the number of said tack welds.

6. The method of claim 4, wherein said welding gap is continuous and wherein the number of said articles is three or four.

7. The method of claim 1, wherein said placing of said article includes attaching said article to one of said structures.

8. The method of claim 1, wherein said placing of said article includes taping or otherwise adhering said article to one of said structures.

9. The method of claim 1, wherein said article is configured with a pre-defined breakpoint that divides said article into a spacer portion that includes said region of selected body thickness and an attachment portion that is positionable to lie on a non-welding surface of one of said structures for attaching said article to said non-welding surface during said tack welding.

10. The method of claim 9, wherein said pre-defined breakpoint includes a score for folding a portion of said article to form said attachment portion.

11. The method of claim 1, wherein said body thickness has a thickness dimension that comprises a multiple of substantially 1/16 inch.

12. The method of claim 1, wherein said article is generally rectangular and has a width dimension and a length dimension that is larger than said width dimension.

13. The method of claim 12, wherein said article is a first article that is joined to a second article of like construction along said length dimension or said width dimension, and wherein said placing includes either placing both said first and second articles without separation thereof, or separating said first article from said second article and placing them at separate locations between said structures.

14. The method of claim 1, wherein said placing includes using one or more of said articles to space said structures from each other.

15. The method of claim 1, wherein said placing includes using one or more of said articles to angularly align said structures relative to each other by either placing said one or more articles at selected locations between said structures, or using articles of differing body thickness, or both.

16. The method of claim 1, wherein said body comprises water-degradable paper laminated into plural layers to provide said body thickness.

17. The method of claim 1, wherein said body comprises water-degradable paper and said degrading agent comprises water or a water-containing substance.

18. The method of claim 17, wherein said degrading agent is applied by directing a jet, stream, spray or mist of said degrading agent onto said article, or by wiping said article with said degrading agent.

19. The method of claim 1, wherein said body comprises a heat-degradable material and said degrading agent comprises heat energy.

20. The method of claim 19, wherein said degrading agent is applied by using a welding gun or a torch.

* * * * *